Feb. 20, 1968   G. J. MANDERS   3,369,292
METHOD OF FORMING GLASS BONDED HEADS
Original Filed Nov. 23, 1962   2 Sheets-Sheet 1
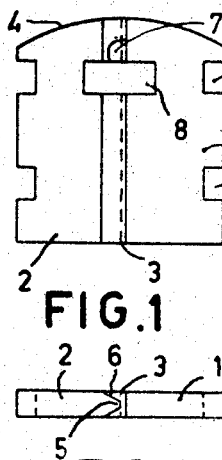
FIG.1
FIG.2
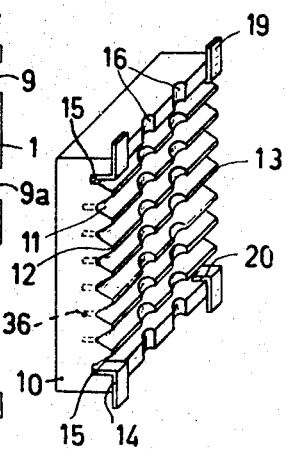
FIG.3
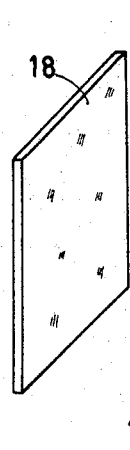
FIG.4
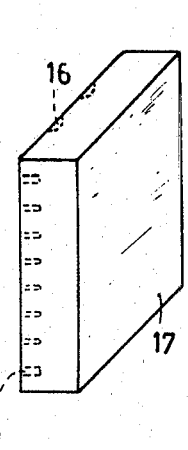
FIG.5
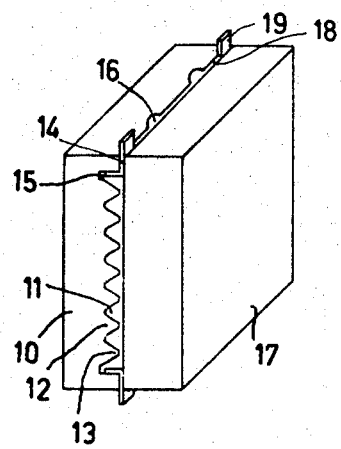
FIG.6
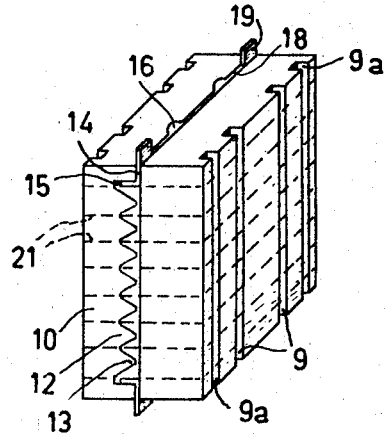
FIG.7
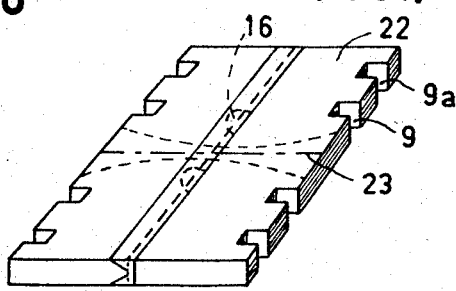
FIG.8
INVENTOR.
GODEFRIDUS J. MANDERS
BY
AGENT Feb. 20, 1968  G. J. MANDERS  3,369,292
METHOD OF FORMING GLASS BONDED HEADS
Original Filed Nov. 23, 1962  2 Sheets-Sheet 2

INVENTOR.
GODEFRIDUS J. MANDERS
BY
Frank R. Trifari
AGENT

United States Patent Office 3,369,292
Patented Feb. 20, 1968

3,369,292
METHOD OF FORMING GLASS BONDED HEADS
Godefridus Johannes Manders, Emmasingel, Eindhoven, Netherlands, assignor to North American Phillips Company, Inc., New York, N.Y., a corporation of Delaware
Original application Nov. 23, 1962, Ser. No. 239,759, now abandoned. Divided and this application Sept. 7, 1965, Ser. No. 509,232
Claims priority, application Netherlands, Sept. 20, 1962, 283,790
3 Claims. (Cl. 29—603)

ABSTRACT OF THE DISCLOSURE

A method of manufacturing transducer heads by forming a plurality of parallel V-shaped projections along the face of a block of ferrite material, forming an auxiliary groove at either end of the block after the last projection, placing a spacer element abutting the face of the block and having a bent portion extending down into the auxiliary groove, forming another plurality of grooves at right angles to the first, glass bonding a mating ferrite block onto the original block, cutting the block between each projection, and cutting the remaining plates into as many separate plates as there are right angle grooves.

This application is a division of Ser. No. 239,759, filed Nov. 23, 1962 and now abandoned.

This invention relates to magnetic transducer heads for recording, reproducing and/or erasing magnetic recordings. It relates in particular to such heads adapted to transduce video signals in a very narrow track of a magnetic record carrier, wherein the head comprises at least two magnetic circuit elements composed of sintered oxidic ferromagnetic material separated by a useful gap; the gap is filled with non-magnetic material which serves to protect the walls of the circuit elements forming the useful gap and also mechanically bonds the two circuit elements together. The invention also relates to a method of manufacturing such transducer heads.

Heads of the above type, especially when used for transducing video signals, must have gaps which are extremely short, of the order of from 1 to 2 microns, and also extremely narrow, of the order of 0.2 mm.; the very narrow dimension is necessary since often a number of tracks are located beside each other. In addition, in order to permit the recording of a large quantity of information per unit of surface area of the carrier, the distance between the tracks must be small.

It is clear that such a transducer head composed of sintered material and having dimensions as narrow as indicated is comparatively weak; there is therefore a danger that both the gap walls and the edges of the head are apt to crumble away. In addition, the fact that the head is narrow means that the bonding of the two circuit elements is weak, especially since the depth of the gap may also be very small in order to maintain the magnetic reluctance of the gap as great as possible. It is known to manufacture such narrow heads with small gap widths by grinding both sides of the upper surface of a comparatively wide head at an angle until the desired width is obtained and then filling with non-magnetic material the portion which was ground away, the non-magnetic material being of such a nature that it adheres to the sintered material of the circuit elements. However, this method of manufacture is a difficult one; in addition it has been found in practice that considerable wear can occur in heads manufactured in this manner.

The magnetic transducer heads according to the invention are not difficult to manufacture and have good wearing properties in operation. According to one aspect of the invention, a magnetic transducer head is provided having two magnetic circuit elements composed of sintered oxidic ferromagnetic material and bonded together as noted above, both elements being of substantially the same thickness, with one element being pointed so that the gap-limiting surface of this element has a much smaller width than the gap-limiting surface of the other element; the portion of the head which includes the small gap-limiting surface is filled with a filling material having approximately the same magnetic and mechanical properties as the material in the gap.

According to one embodiment of the invention, the filling material at the small gap-limiting surface is the same as the material in the gap. This embodiment has the advantage that both the coefficient of expansion and the resistance to detrition of the filling material are exactly the same as those of the material in the gap; thus, the side walls of the bearing surface are protected as well as the gap walls, and the same detrition exists throughout the bearing surface of the head.

According to a further embodiment of the invention, the narrow gap-limiting surface preferably is located in the center of the particular circuit element and the filling material extends on both sides of this element.

The invention also includes a method of manufacturing a magnetic transducer head of the above type. According to one aspect of the method, a first plurality of parallel grooves are formed in the major portion of a side face of either of two substantially identical blocks of sintered oxidic ferromagnetic material; a narrow portion of the side face parallel to these grooves is retained. The grooves are separated by projections having a V-shaped cross-section, the tip of the V being flattened with the flat portion being located in the side face, the width of the flat portion being equal to the desired width of the gap. In addition an auxiliary groove having an approximately rectangular cross-section is provided in each of said narrow portions or in the corresponding position in the side face of the second block, said auxiliary grooves extending in parallel with said first plurality of grooves. Then either of the two side faces is provided with a second plurality of grooves which are at right angles to the first plurality and have a substantially semi-circular cross-section, the number and the position of the second plurality of grooves being determined by the desired number and the shape of the heads, after which the block having the auxiliary grooves is provided with spacing members in the form of foils having a thickness equal to the desired gap length, a part of the foils being located in the auxiliary grooves. After this, both blocks are placed against each other with the interposition of a glass plate which has a thickness greater than the desired gap length and then the resulting assembly is heated under pressure to a temperature above the melting temperature of the glass. After melting and cooling, the assembly is divided into plates by grinding or sawing parallel to the projections, the surface of separation between two plates is always in the center between two projections, the resulting plates being divided by a similar operation at right angles to the direction of the projections into a number of parts equal to the number of said second plurality of grooves; each part comprises one portion of such a groove, and the resulting parts are provided with coils and a bearing surface.

There are various ways according to the invention in which the signal coil space may be made. According to one embodiment of the invention, an additional groove having a substantially rectangular cross-section is provided in the block adjacent to and in parallel with each of said second plurality of grooves, said additional groove being used as the coil space. According to another embodiment of the invention, the coil space is provided in each finished part by ultra-sonic machining in a manner such that a portion of the glass filling the semi-circular groove is removed. In order to form an easy outlet for the excess glass, the enclosed air, and possibly formed gas, narrow grooves which are parallel to the projections may be provided in the bottoms of the grooves separated by V-shaped projections and/or in the corresponding position in the side face of the second block.

The side faces of the block comprising the V-shaped projections may be ground beforehand, so that these side faces may be used as reference surfaces during manufacturing. However, it is desired to establish the position of the glass plate accurately; according to an embodiment of the invention the grooves having the semi-circular cross-section may be provided in the second block, the glass plate in this case being provided with ridges fitting these grooves.

For correct centering of the assembly, a deep groove at right angles to the projection may be provided in both blocks and the glass plate may consist of two parts, a centering beam being provided in the two correspondingly located grooves before compressing and heating the assembly, said beam being of the same material as the material of the blocks, and each glass plate being placed on either side of the beam.

According to a further embodiment, the position of the semi-circular grooves and the place where the plates are physically separated into parts are chosen so that the distance in each part between an edge of a part and the most adjacent principal limiting is equal to the desired depth of the gap of the head.

In order that the invention may readily be carried into effect, certain embodiments thereof will now be described more fully, by way of example, with reference to the accompanying drawing, in which:

FIG. 1 shows a finished head on an enlarged scale;

FIG. 2 is a plan view of the head as shown in FIG. 1 also on an enlarged scale;

FIG. 3 shows a block of sintered oxidic ferromagnetic material provided with grooves;

FIG. 4 shows a glass plate;

FIG. 5 shows a block of the same material and the same dimensions as the block shown in FIG. 3;

FIG. 6 shows a combination of the parts shown in FIGS. 3, 4 and 5;

FIG. 7 shows the assembly of FIG. 6 provided with lateral grooves;

FIG. 8 shows a plate which is cut from the block shown in FIG. 7;

Figure 9:
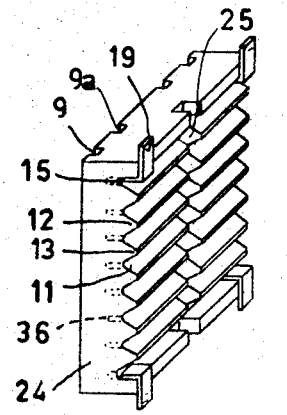
FIG. 9 shows another embodiment of the block shown in FIG. 3.

Referring now to FIGS. 1 and 2, a magnetic transducer head is shown which is particularly useful for recording and reproducing video signals, the head consisting of two magnetic circuit elements 1 and 2 which are separated by a useful gap 3. The gap 3 which has a length of, for example, 1½ microns, is filled with glass or other non-magnetic material which bonds the members 1 and 2 together. The head has a rounded bearing surface 4 along which a magnetic record carrier such as a tape is adapted to move. The element 2 is pointed and V-shaped, the V-shape having a flat surface 5 the two ends of which define the gap width. Non-magnetic material 6 is provided to fill out the portions of element 2 which were cut away to form the V-shape in a manner such that the total width of the element 2 at all parts thereof is the same as the total width of the element 1. The nonmagnetic material 6 is preferably the same as that which fills the gap 3. Below the active part of the gap 3 a cavity 7 is provided which is also filled with glass and serves for supporting and strengthening the part of the head located above it. In addition the head includes a rectangular coil space 8 for receiving the turns of a coil (not shown), which turns are provided on the outside of the head in grooves 9. Grooves 9a serve for connecting the head. Such a head is comparatively strong; both the gap surfaces and the surfaces of the V-shaped part of element 2 are supported, so that no crumbling can take place during operation; in addition, sufficient support is provided for the lower part of the gap. Since the same material is placed both in the gap and at the surfaces of the V-shaped part and serves as a support, and the coefficient of expansion and the resistance to detrition of this material may be chosen to conform with the material of the head itself, a homogeneous assembly is obtained.

One manner of manufacturing such a head will now be described. In FIG. 3, reference numeral 10 denotes a block of sintered oxidic ferromagnetic material hereinafter termed ferrite. In this block 10 which comprises four ground side walls, grooves 11 are formed in one side wall as shown. These grooves are separated by projections 12 which are V-shaped, the tip of the V having a flat portion 13. This flat portion 13 is located in the plane of the side wall and has the same width as the desired gapwidth 5 in FIG. 2. When forming the grooves 11, small surfaces 14 are retained; grooves 15, having a substantially rectangular cross-section, are provided in the surfaces 14 approximately in parallel with the projections 12. Finally, grooves 16 having approximately a semi-circular cross-section are ground into the projections 12; the grooves 16 have axes extending at right angles to the projections 12. The determination of the position and the number of these grooves 16 will be described below. A second block 17 also composed of ferrite (FIG. 5) has approximately the same dimensions as the outer dimensions of block 10. A glass plate 18 (FIG. 4) has the same length and width as the blocks 10 and 17 and has a thickness which somewhat exceeds the desired gap length. With a gap length of for example 1½ microns the thickness of the glass plate is approximately 5 microns.

When manufacturing the magnetic recording heads as shown in FIGS. 1 and 2, metal foils 19 having the same thickness as the desired gap length are first placed on the block 10 at the four corners as shown. A bent portion 20 of this foil is supported in the groove 15. Foils composed of mica may also be used; while shown in FIG. 3 at the corners only, the foils may extend throughout the length of the groove 15. Then the glass plate 18 is placed on the block 10 after which the block 17 is placed on plate 18, the assembly of FIG. 6 resulting from these steps. The ground side walls of the block 10 serve as reference surfaces. The assembly of FIG. 6 is now heated to a temperature above that of the melting temperature of the glass plate 18; during the heating step, pressure is exerted at right angles to the blocks on both exposed sides thereof. As soon as the glass has melted, the grooves 16 also become filled with glass. The foils 19 serve as spacing members; the foils are therefore composed of a material whose melting temperature is higher than the melting temperature of the glass. After cooling the assembly, the block is provided with grooves 9 and 9a on either side (FIG. 7) and is then sawed into plates along the dotted lines 21, the plates being indicated by reference numeral 22 in FIG. 8. Plate 22 is now sawed into two parts along the dotted line 23 and provided with a rounded bearing surface 4 and, by preferably ultrasonic machining with a coil space 8, so that finally, a head is obtained as shown in FIGS. 1 and 2.

It can be seen that the material in the gap on either side of the V-shaped portion and the material which serves for supporting the gap walls is the same. It is clear that the position of the grooves 16 is determined by the ultimately desired gap depth as appears from FIG. 8. More than two grooves 16 may be provided as desired; the number depends upon the number of heads to be manufactured from the plates 22 and upon the width of the blocks 10 and 17 and the glass plate 18. The distance between the grooves 16 in case of more than two grooves will consequently not be equal to one another in most of the cases.

The grooves 15 and 16 may be provided in the block 17 as shown in FIG. 5 in dotted lines instead of in the block 10. In this case it is necessary that both blocks 10 and 17 have the same length and width and that the side faces of both blocks are readily polished so that accurately located reference surfaces are available.

The method described has the advantage of being simple and of providing a plurality of heads whose dimensions may be determined accurately beforehand. Also heads may be obtained having different dimensions, if such is desired, by varying the distance between adjacent projections 12 (and flat portions 13).

Figures 10, 11:
FIG. 10 is a glass plate separated into two parts and provided with ridges.
FIG. 11 shows a centering beam.
Figure 12:
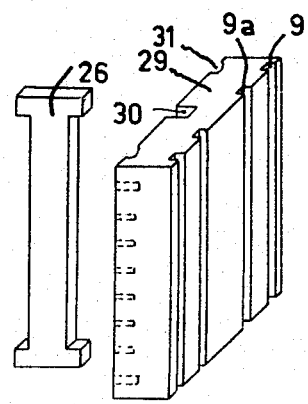
FIG. 12 shows a block similar to that shown in FIG. 5.
Figure 13:
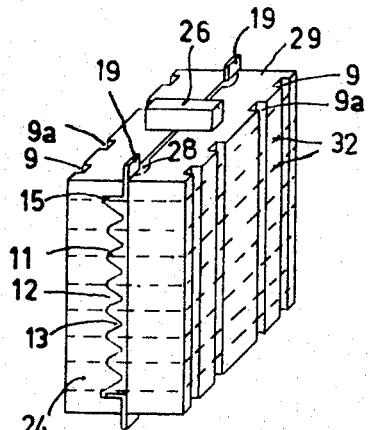
FIG. 13 shows a combination of the parts shown in FIGS. 9, 10, 11 and 12.
Figure 14:
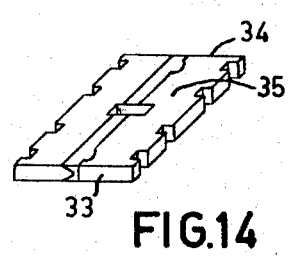
FIG. 14 shows a plate which is cut from the block shown in FIG. 13.
Figure 15:
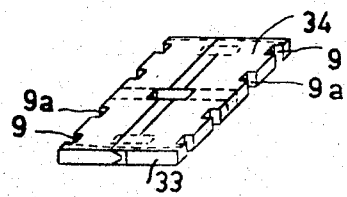
FIG. 15 shows the plate of FIG. 14 after further processing.
Figure 16:
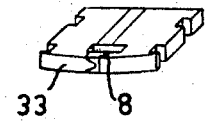
FIG. 16 shows a head manufactured from the plate shown in FIG. 15.

In FIGS. 9 to 16 another embodiment of the method is shown for manufacturing the heads shown in FIGS. 1 and 2. In FIG. 9, a ferrite block is indicated by reference numeral 24 and is again provided with grooves 11, projections 12 and flat portions 13. Grooves 15, 9 and 9a are also provided, and foils 19 are put in place in the same manner as in FIG. 3. In addition, a groove 25 is ground in the block 24. A centering beam 26 is shown in FIG. 11 and this centering beam is fitted into groove 25. The glass plate used for this embodiment consists of two parts 27 (FIG. 10) which are each provided with ridges 28 as shown. A ferrite block 29 (FIG. 12) also includes a groove 30 in which half of the centering beam 26 is adapted to fit. Grooves 31 are provided in block 29; they correspond to the groove 16 shown in FIG. 3 and are adapted to receive the ridges 28. In this case, the side faces of the two blocks 24 and 29 need not be polished. The centering beam may also be manufactured from ferrite; its use ensures that when placing the two blocks 24 and 29 on each other the correct position of both blocks relative to each other is maintained. After heating at a suitable temperature under pressure, the block shown in FIG. 13 is sawed into plates 35 along the dotted lines 32; the plates are shown in FIG. 14. After providing the coil space 8 and after rounding the two side faces 33 and 34 by means, for example, of ultrasonic machining, the plates may be sawed into two elements each forming a head section. It is clear from FIG. 15 that a bearing surface in this case is formed on the outside of the plates 35. However, this depends only on the position of the grooves 31 and the ridges 28. Of course it is also possible to provide the grooves 31 nearer to the center and in this case the bearing surfaces 33 and 34 are ground on the other side.

The coil space 8 may also be provided beforehand by grinding a groove of approximately rectangular cross-section in the blocks on the one side of the groove 16 or 31 and in the other block in a corresponding position. In this case, some glass will enter the coil space but this will be inconsequential during winding.

In order to allow the air or gases formed during the manufacture to escape easily during the heating of the blocks under pressure, grooves 36 (shown by dotted lines) may be provided in the bottom of the grooves 11 and/or in corresponding positions of the second block. These grooves, together with the grooves 15, may receive the excess glass.

It is of course also possible to provide another block against the side face of the block 17 and 29 respectively, which is not in contact with the block 10 and 24 respectively, the additional block being provided with grooves 11 on either side, and to close this latter block with the interposition of the glass plate 18 or 20 and a block 17 and 29 respectively, so that more heads may be obtained in one heating step.

As compared with the known methods for manufacturing heads having extremely short gap length and very narrow gap widths, the method described has the advantage that it requires only one heating cycle, as a result of which the possibility of making mistakes is minimized. In addition, the methods according to the invention are very suitable for mass production of magnetic recording heads, since in principle a large number of heads may be manufactured simultaneously.

While the invention has been described with respect to specific embodiments, various changes and modifications will be readily apparent to those skilled in the art without departing from the inventive concept, the scope of which is set forth in the appended claims.

I claim:

1. A method of manufacturing magnetic transducer heads, comprising: forming a first plurality of parallel grooves in a side face of one block of sintered oxidic ferromagnetic material, each pair of said grooves being separated by a V-shaped projection, the tip of each projection being flat and extending co-planar with the plane of said side face, the width of each flat portion of said projection being equal to the desired gap width of the head, retaining a narrow strip of said side face on either side of said first plurality of grooves, forming an auxiliary groove having a substantially rectangular cross-section in each said narrow strip, each auxiliary groove extending parallel with said first plurality of grooves, forming a second plurality of grooves extending through said projections at right angles to said first plurality, said second plurality of grooves having a substantially semi-circular cross-section, placing spacing members, each being of a thickness equal to the desired gap length and each having an offset portion, upon the multi-grooved side face of said block with the spacers abutting said side face and respective offset portions engaging an auxiliary groove, placing a glass plate having a thickness greater than the desired gap length against said spacing members, placing a second block of sintered oxidic ferromagnetic material against said glass plate, heating the resulting assembly under pressure to a temperature above the melting temperature of glass, allowing the assembly to cool to thereby render the assembly bonded, and separating the assembly into plates, each plate being parallel to and including a projection, and then dividing the plates thus obtained at right angles to the direction of the projections into as many parts as the number of said second plurality of grooves.

2. A method of manufacturing magnetic transducer heads comprising: forming a first plurality of parallel grooves in a side face of one block of sintered oxidic ferromagnetic material, each pair of said grooves being separated by a V-shaped projection, the tip of each projection being flat and extending co-planar with the plane of said side face, the width of each flat portion of said projections being equal to the desired gap width of the head, retaining a narrow strip of said side face on either side of said first plurality of grooves, forming a second plurality of grooves extending through said projections at right angles to said first plurality, said second plurality of grooves having a substantially semi-circular cross-section, forming at least one auxiliary groove having a substantially rectangular cross-section in a side face of a second block of sintered oxidic ferromagnetic material, the side face of said second block having substantially the same cross-section as said one block, said auxiliary groove extending parallel with said first plurality of grooves when said side faces are superimposed, placing spacing members, each being of a thickness equal to the desired gap length and each having an offset portion, upon the multigrooved side face of said block with the spacers abutting said side face and respective offset portions engaging an auxiliary groove, placing a glass plate having a thickness greater than the desired gap length against said side face of said first block, placing said spacing members against said glass plate, heating the resulting assembly under pressure to a temperature above the melting temperature of glass, allowing the assembly to cool to thereby render the assembly bonded, and separating the assembly into plates, each plate being parallel to and including a projection, and then dividing the plates thus obtained at right angles to the direction of the projections into as many parts as the number of said second plurality of grooves.

3. A method of manufacturing magnetic transducer heads, comprising: forming a first plurality of grooves in a side face of one block of sintered oxidic ferromagnetic material, each pair of said grooves being separated by a projection, the tip of each projection being substantially flat and extending co-planar with the plane of said side face, the width of each flat portion of said projection being substantially equal to the desired gap width of the head, retaining a narrow strip of said side face on either side of said first plurality of grooves, forming an auxiliary groove having a substantially rectangular cross-section in each said narrow strip, each auxiliary groove extending parallel with said first plurality of grooves, forming a second plurality of grooves extending through said projections at right angles to said first plurality, said second plurality of grooves having a substantially semi-circular cross-section, placing spacing members, each being of a thickness equal to the desired gap length and each having an offset portion, upon the multigrooved side face of said block with the spacers abutting said side face and respective offset portions engaging an auxiliary groove, placing a glass plate having a thickness greater than the desired gap length against said spacing members, placing a second block of sintered oxidic ferromagnetic against said glass plate heating the resulting assembly under pressure to a temperature above the melting temperature of glass, allowing the assembly to cool to thereby render the assembly bonded, and separating the assembly into plates, each plate being parallel to and including a projection, and then dividing the plates thus obtained at right angles to the direction of the projections into as many parts as the number of said second plurality of grooves.

References Cited
UNITED STATES PATENTS

| | | | |
|---|---|---|---|
| 2,032,003 | 2/1936 | Clause | 65—43 X |
| 2,707,694 | 5/1955 | Standring | 156—295 X |
| 3,187,410 | 6/1965 | Duinker et al. | 29—155.5 |
| 3,187,411 | 6/1965 | Duinker et al. | 29—155.5 |
| 3,258,542 | 6/1966 | Pfost | 29—155.5 X |

JOHN F. CAMPBELL, *Primary Examiner.*

R. W. CHURCH, *Assistant Examiner.*